(12) United States Patent
Sato et al.

(10) Patent No.: US 11,407,310 B2
(45) Date of Patent: Aug. 9, 2022

(54) VEHICLE DISPLAY DEVICE

(71) Applicant: TOYOTA JIDOSHA KABUSHIKI KAISHA, Aichi-ken (JP)

(72) Inventors: Kenji Sato, Toyota (JP); Kei Yamamoto, Toyota (JP); Takashi Nishimoto, Owariasahi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 155 days.

(21) Appl. No.: 16/888,855

(22) Filed: Jun. 1, 2020

(65) Prior Publication Data

US 2021/0031627 A1 Feb. 4, 2021

(30) Foreign Application Priority Data

Aug. 2, 2019 (JP) .............................. JP2019-142668

(51) Int. Cl.
*B60K 35/00* (2006.01)
*H04N 9/31* (2006.01)

(52) U.S. Cl.
CPC ........... *B60K 35/00* (2013.01); *H04N 9/3141* (2013.01); *B60K 2370/152* (2019.05); *B60K 2370/165* (2019.05); *B60K 2370/334* (2019.05); *B60K 2370/739* (2019.05); *B60K 2370/77* (2019.05)

(58) Field of Classification Search
None
See application file for complete search history.

(56) References Cited

U.S. PATENT DOCUMENTS

| 9,946,064 | B1 * | 4/2018 | Chen | ..................... G02B 5/3083 |
| 2007/0153236 | A1 * | 7/2007 | Quach | ................... G03B 21/604 353/20 |
| 2020/0198468 | A1 * | 6/2020 | Anand | ....................... G06T 7/13 |

FOREIGN PATENT DOCUMENTS

| CN | 110462456 A | * | 11/2019 | ............. G02B 1/111 |
| EP | 3569474 A1 | * | 11/2019 | ............. B60K 35/00 |
| JP | 2013029855 A | * | 2/2013 | ............. B60K 35/00 |
| JP | 2015102807 A | | 6/2015 | |
| JP | 201715824 A | | 1/2017 | |
| JP | 2018125671 A | * | 8/2018 | ............. B60K 35/00 |
| WO | WO-2017221527 A1 | * | 12/2017 | ............... G02B 5/02 |
| WO | WO-2018011047 A1 | * | 1/2018 | ............. B60K 35/00 |
| WO | WO-2019003626 A1 | * | 1/2019 | ............... C08J 5/18 |

* cited by examiner

*Primary Examiner* — Reza Aghevli
(74) *Attorney, Agent, or Firm* — Hauptman Ham, LLP

(57) ABSTRACT

A projector is disposed inside a seatback of a front seat as a vehicle seat; therefore, when a driver as an occupant seated in the front seat checks the rear side with a rearview mirror or the like, the projector can be restrained from entering the field of view of the driver. Accordingly, different from the case in which the projector is disposed on a ceiling of the vehicle cabin or the like and exposed into the vehicle cabin, it is possible to restrain the projector from blocking the field of view of the driver.

2 Claims, 3 Drawing Sheets

VEHICLE DISPLAY DEVICE

INCORPORATION BY REFERENCE

The disclosure of Japanese Patent Application No. 2019-142668 filed on Aug. 2, 2019 including the specification, drawings and abstract is incorporated herein by reference in its entirety.

BACKGROUND

1. Technical Field

The disclosure relates to a vehicle display device having a transparent screen and a projector.

2. Description of Related Art

Japanese Patent Application Publication No. 2015-102807 discloses a vehicle display device that includes: a projector disposed on a ceiling of a vehicle cabin between a driver's seat and an occupant's seat; and a liquid crystal screen that is transparent when no image is projected from the projector and changes into a translucent state when an image is projected from the projector.

Unfortunately, the vehicle display device disclosed in the above publication has the following problems. Since the projector is disposed on the ceiling, when the driver checks the rear side with a rearview mirror or the like, the projector may block the field of view of the driver.

SUMMARY

An object of the present disclosure is to provide a vehicle display device that can restrain a projector from blocking the field of view of a driver.

The present disclosure to achieve the above object is as follows.

(1) A vehicle display device including: a transparent screen disposed in a vehicle cabin; and a projector that is disposed inside a seatback of a vehicle seat and projects a video image onto the transparent screen.

(2) The vehicle display device as set forth in (1), wherein the transparent screen is disposed upward of the seatback and vehicle rearward of a headrest of the vehicle seat.

(3) The vehicle display device as set forth in (1) or (2), wherein the projector has a projection lens exposed from an opening formed in the seatback into the vehicle cabin and projecting a video image onto the transparent screen.

(4) The vehicle display device as set forth in (3), wherein: the seatback includes a back surface, an upper surface, and a curved portion connecting the back surface to the upper surface; and the opening of the seatback is formed in an upper portion of the back surface of the seatback, in the upper surface of the seatback, or in the curved portion of the seatback.

According to the vehicle display device of the above (1), the following effects can be obtained.

Since the projector is disposed inside the seatback of the vehicle seat, it is possible to restrain the projector from entering the field of view of the driver when the driver checks the rear side with a rearview mirror or the like. Therefore, it is possible to restrain the projector from blocking the field of view of the driver.

Since the projector is disposed inside the seatback, it is possible to restrain the projector from being exposed to the vehicle cabin, and to restrain the projector from blocking the field of view of an occupant seated in the rear seat.

According to the vehicle display device of the above (2), the following effects can be obtained.

The transparent screen is disposed upward of the seatback and vehicle rearward of the headrest; therefore, when the apparatus is turned on (when in use), an occupant in the rear seat can enjoy a video image projected from the projector on the transparent screen.

Further, since the transparent screen is disposed upward of the seatback and vehicle rearward of the headrest, the transparent screen can be disposed vehicle frontward, as compared with the case in which the transparent screen is disposed vehicle rearward of the seatback. Therefore, it is possible to reduce the feeling of pressure felt by an occupant in the rear seat both when the device is turned on (when in use) and when the device is turned off (when out of use).

In general, it is known that when a line of sight of the occupant in the rear seat who is watching a video image projected on the transparent screen is directed downward, the occupant in the rear seat is likely to get motion sickness. In the present disclosure, the transparent screen is disposed upward of the seatback and vehicle rearward of the headrest. Therefore, the line of sight of the occupant in the rear seat can be directed upward, as compared with the case in which the transparent screen is disposed vehicle rearward of the back surface of the seatback. Therefore, it is possible to restrain the occupant in the rear seat from getting motion sickness.

Further, the transparent screen is "transparent"; therefore, although the screen is disposed on vehicle rearward of the headrest, it is possible to restrain the screen from blocking the field of view of the driver when the driver checks the rear side with a rearview mirror or the like. In addition, even for an occupant seated in the rear seat, it is possible to restrain the screen from blocking the field of view of the occupant seated in the rear seat when the device is turned off and the occupant views the scenery before the vehicle.

According to the vehicle display device of the above (3), the following effects can be obtained.

The projector has the projection lens exposed into the vehicle cabin through the opening formed in the seatback and projects a video image onto the transparent screen; therefore, a video image can be projected from the projector onto the transparent screen even when the projector is disposed inside the seatback.

According to the vehicle display device of the above (4), the following effects can be obtained.

The opening of the seatback is provided in the upper portion of the back surface of the seatback, in the upper surface of the seatback, or in the curved portion of the seatback; thus, even in the case in which the transparent screen is disposed above the seatback and vehicle rearward of the headrest in the vehicle rear side, a video image can be projected onto the transparent screen from the projector disposed inside the seatback.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic perspective view of a vehicle display device according to an embodiment of the present disclosure when the vehicle display device is turned on;

FIG. 3 is a schematic side view of the vehicle display device according to the embodiment of the present disclosure when the vehicle display device is turned on.

DETAILED DESCRIPTION OF EMBODIMENTS

Figure 1:
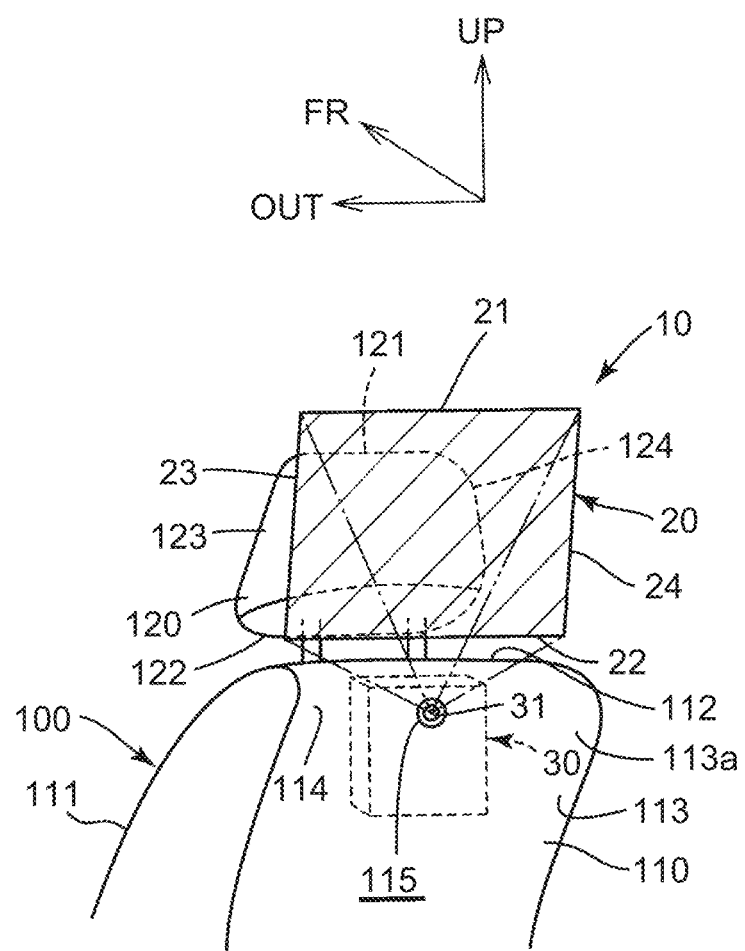

Hereinafter, a vehicle display device according to an embodiment of the present disclosure will be described with reference to the drawings. In the drawings, FR indicates the front side in the vehicle front-rear direction (front-rear direction), UP indicates the upper side in the vehicle height direction (up-down direction), and OUT indicates the outer side in the vehicle left-right direction (left-right direction, vehicle width direction).

Figure 3:
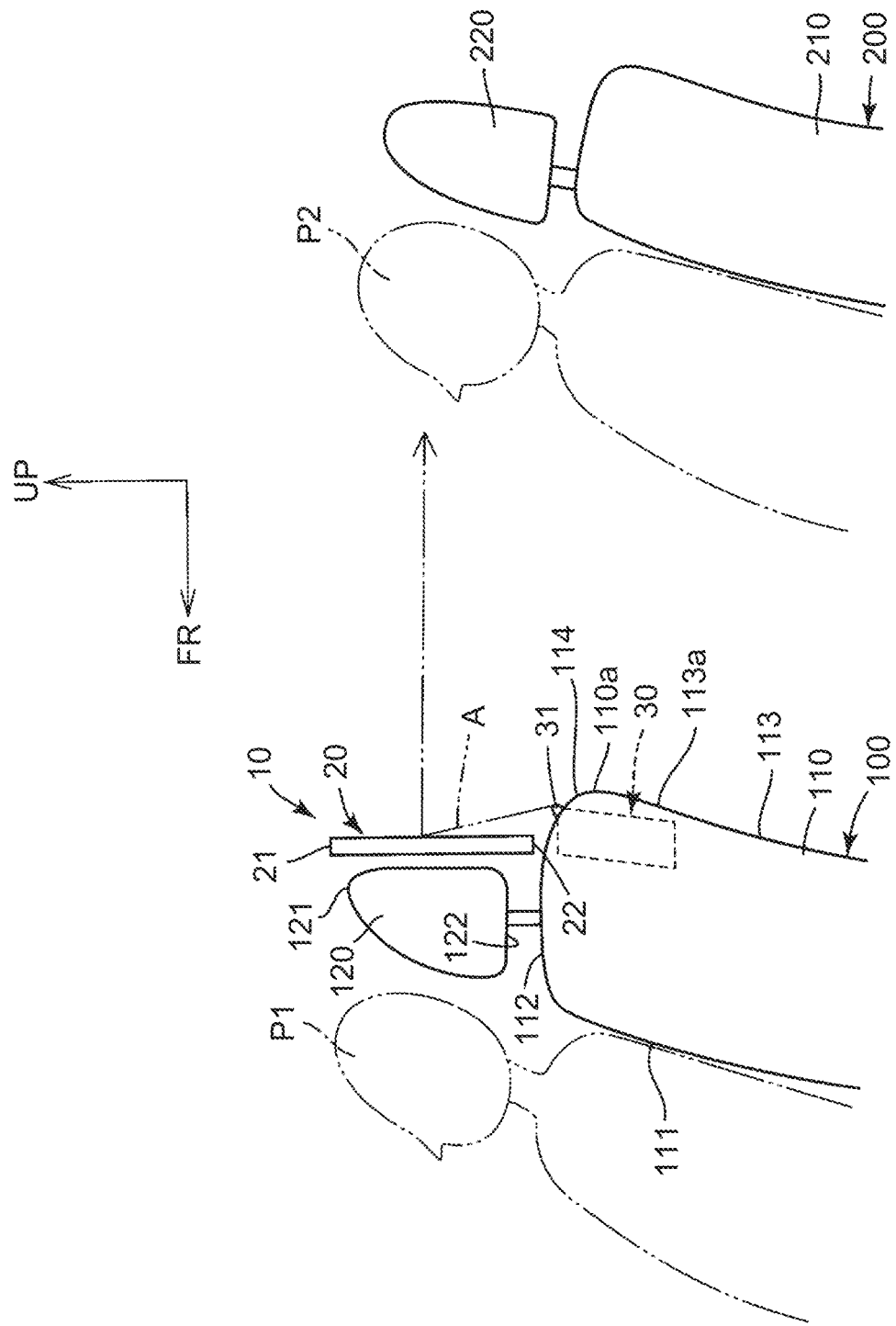

As shown in FIG. 3, a vehicle display device (hereinafter, also simply referred to as a device) 10 according to the embodiment of the present disclosure is a device used for the rear entertainment, and is a device used for an occupant P2 seated in a rear seat 200 located vehicle rearward of a front seat 100 to enjoy video images (including images). The front seat 100 may be a driver's seat or a passenger's seat.

The front seat 100 has a seatback 110 and a headrest 120. The seatback 110 is used as a backrest of an occupant P1 seated in the front seat 100. The seatback 110 is provided to extend upward from a vehicle rear end of a seat cushion (not shown) on which the occupant P1 is seated. The headrest 120 is disposed above the seatback 110 so as to support the head of the occupant P1.

As with the front seat 100, the rear seat 200 also has a seatback 210 and a headrest 220. The seatback 210 is used as a backrest of the occupant P2 seated in the rear seat 200. The seatback 210 is provided to extend upward from a vehicle rear end of a seat cushion (not shown) on which the occupant P2 is seated. The headrest 220 is disposed above the seatback 210 so as to support the head of the occupant P2.

The device 10 includes a transparent screen 20 and a projector 30 that projects (emits) a video image onto the transparent screen 20.

The transparent screen 20 is disposed in the vehicle cabin, for example, above the seatback 110 of the front seat 100 and vehicle rearward of the headrest 120 of the front seat 100. Note that, when the vehicle has three rows of seats (front seats and two rows of rear seats) instead of having only two rows of seats (only front seats and one row of rear seats), the transparent screen 20 may be disposed vehicle rearward not of the headrest 120 of the front seat 100 but of the headrest 220 of the second row seat (first rear seat). In the embodiment and an exemplified example of the present disclosure, the case in which the transparent screen 20 is disposed vehicle rearward of the headrest 120 of the front seat 100 will be described.

The transparent screen 20 may be attached to the seatback 110 of the front seat 100, may be attached to the headrest 120 of the front seat 100, or may be suspended from a ceiling of the vehicle cabin. The transparent screen 20 may have a function as a partition partitioning the front seat 100 and the rear seat 200 from each other, which is generally used in a taxi or the like. The transparent screen 20 has a sheet shape extending in a direction perpendicular or substantially perpendicular to the vehicle front-rear direction.

The transparent screen 20 is located vehicle rearward of a vehicle front side surface 111 of the seatback 110 and vehicle frontward of a vehicle rear end 110a of the seatback 110. An upper end 21 of the transparent screen 20 is preferably located above an upper end 121 of the headrest 120 such that the dimension of the transparent screen 20 in the height direction (vehicle height direction) can be increased. Note that the upper end 21 of the transparent screen 20 may be at the same position in the height direction as that of the upper end 121 of the headrest 120, or may be located below the upper end 121 of the headrest 120. A lower end 22 of the transparent screen 20 is preferably located below a lower end 122 of the headrest 120 such that the dimension in the height direction of the transparent screen 20 can be increased, and may be in contact with an upper surface 112 of the seatback 110. Note that the lower end 22 of the transparent screen 20 may be located at the same position in the height direction as that of the lower end 122 of the headrest 120, or may be located above the lower end 122 of the headrest 120.

Figure 2:
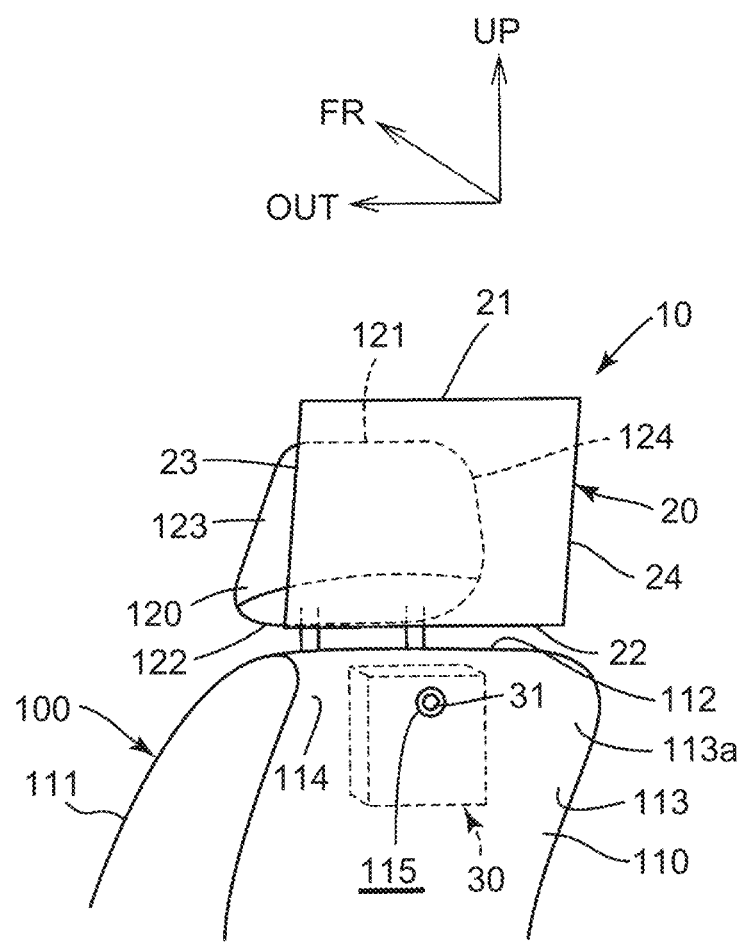
FIG. 2 is a schematic perspective view of the vehicle display device according to the embodiment of the present disclosure when the vehicle display device is turned off.

As shown in FIG. 1, FIG. 2, a left end 23 of the transparent screen 20 is preferably located vehicle leftward of a left end 123 of the headrest 120 such that the dimension in the left-right direction of the transparent screen 20 can be increased. Note that the left end 23 of the transparent screen 20 may be located at the same position in the left-right direction as that of the left end 123 of the headrest 120, or may be located vehicle rightward of the left end 123 of the headrest 120. A right end 24 of the transparent screen 20 is preferably located vehicle rightward of a right end 124 of the headrest 120 such that the dimension in the left-right direction of the transparent screen 20 can be increased. Note that the right end 24 of the transparent screen 20 may be located at the same position in the left-right direction as that of the right end 124 of the headrest 120, or may be located vehicle leftward of the right end 124 of the headrest 120.

The transparent screen 20 is transparent when the device 10 is turned off (when out of use), that is, when no video image is projected from the projector 30 and the occupant P2 in the rear seat 200 can visually recognize no video image. Note that the term "transparent" herein may mean "transparently visually recognizable", and may also mean not only "completely transparent" but also "translucent".

When the device 10 is turned on (when in use), that is, when a video image is projected from the projector 30 and the occupant P2 in the rear seat 200 can visually recognize the video image, the transparent screen 20 displays the video image projected from the projector 30. In FIG. 1, the video image projected on the transparent screen 20 from the projector 30 is indicated by oblique lines.

The transparent screen 20 is not a rear projection screen (transmission screen) but a front projection screen (reflection screen). The transparent screen 20 reflects a projected light emitted from the projector 30 on its vehicle rear side such that brightness of the reflected light is ensured. Note that when the device 10 is turned on, the transmissivity of the transparent screen 20 may be set lower than that when the device 10 is turned off by an electronic shade so as to further increase the brightness of the reflected light.

The projector 30 is disposed inside the seatback 110 of the front seat 100, as shown in FIG. 3. The projector 30 is disposed inside the seatback 110 at an upper portion of the seatback 110 (portion located above the center position in the height direction). It is preferable that the projector 30 be disposed inside the seatback 110 at a position closer to a back surface 113 located vehicle rearward of the vehicle front side surface 111 of the seatback 110. The reason for this is because an uncomfortable feeling felt by the occupant P1 seated in the front seat 100 can be reduced when the occupant P1 leans against the seatback 110 and abuts on the projector 30.

As shown in FIG. 1, FIG. 2, the projector 30 includes a projection lens 31 that is exposed from an opening 115 formed in the seatback 110 to the inside of the vehicle cabin, and projects a video image onto the transparent screen 20. The occupant P2 in the rear seat 200 can visually recognize only the projection lens 31 of the projector 30 directly or through the opening 115 from the vehicle cabin. That is, of the projector 30, only the projection lens 31 can be visibly recognized from the vehicle cabin.

The opening 115 is provided at least at one location, that is, in an upper portion 113a of the back surface 113 located upward of the center position in the height direction of the back surface 113 of the seatback 110, in the upper surface 112 of the seatback 110, or in a curved portion 114 that connects the upper surface 112 to the back surface 113. The projection lens 31 and the opening 115 are located vehicle rearward and downward of the transparent screen 20.

As shown by an arrow A in FIG. 3, a video image projected (projection light emitted) from the projection lens 31 enters the transparent screen 20 from the vehicle rear and lower side, and is reflected by the transparent screen 20 toward the vehicle rear side. Thereby, the occupant P2 in the rear seat 200 located vehicle rearward of the transparent screen 20 can visually recognize the video image projected on the transparent screen 20.

Next, operation and effects of the embodiment of the present disclosure will be described.

(A) The projector 30 is disposed inside the seatback 110 of the front seat 100 as the vehicle seat; therefore, when a driver as the occupant P1 in the front seat 100 checks the rear side with a rearview mirror or the like, the projector 30 can be restrained from entering the field of view of the driver. Therefore, it is possible to restrain the projector 30 from blocking the field of view of the driver, which is different from the case in which the projector 30 is provided on the ceiling of the vehicle cabin or the like and exposed into the vehicle cabin.

(B) Since the projector 30 is disposed inside the seatback 110, it is possible to restrain the projector 30 from being exposed into the vehicle cabin, and also to restrain the projector 30 from blocking even the field of view of the occupant P2 in the rear seat 200.

(C) The transparent screen 20 is disposed upward of the seatback 110 and vehicle rearward of the headrest 120 of the front seat 100; therefore, when the device 10 is turned on (when in use), the occupant P2 in the rear seat 200 can enjoy a video image projected on the transparent screen 20 from the projector 30.

(D) The transparent screen 20 is disposed upward of the seatback 110 and vehicle rearward of the headrest 120 of the front seat 100; therefore, the transparent screen 20 can be located vehicle frontward, as compared with the case in which the transparent screen 20 is located vehicle rearward of the back surface 113 of the seatback 110. Accordingly, a feeling of pressure felt by the occupant P2 in the rear seat 200 can be reduced both when the device 10 is turned on (when in use) and when turned off (when out of use).

(E) In general, it is known that when a line of sight of the occupant P2 in the rear seat 200 who is watching a video image projected on the transparent screen 20 is directed downward, the occupant P2 in the rear seat 200 is likely to get motion sickness. In the embodiment of the present disclosure, the transparent screen 20 is disposed upward of the seatback 110 and vehicle rearward of the headrest 120. Therefore, the line of sight of the occupant P2 in the rear seat 200 can be directed upward, as compared with the case in which the transparent screen 20 is disposed vehicle rearward of the back surface 113 of the seatback 110. Accordingly, it is possible to prevent the occupant P2 in the rear seat 200 from getting motion sickness.

(F) The transparent screen 20 is "transparent"; therefore, even when the screen 20 is disposed vehicle rearward of the headrest 120, it is possible to restrain the screen 20 from blocking the field of view of the driver when the driver checks the rear side with a rearview mirror or the like. Further, when the occupant P2 is in the rear seat 200, and when the device 10 is turned off and the occupant P2 views the scenery before the vehicle, it is possible to restrain the screen 20 from blocking the field of view of the occupant P2.

(G) The transparent screen 20 is "transparent" and can be restrained from blocking the field of views of the driver and the occupant P2 in the rear seat 200; thus, the screen 20 can be made larger, for example, larger than the headrest 120 as viewed from the vehicle front-rear direction. Therefore, it is advantageous in enhancement of the rear entertainment performance.

(H) The projector 30 has the projection lens 31 that is exposed from the opening 115 formed in the seatback 110 into the vehicle cabin and projects a video image onto the transparent screen 20; therefore, even when the projector 30 is disposed inside the seatback 110, a video image can be projected from the projector 30 onto the transparent screen 20.

(I) The opening 115 of the seatback 110 is formed in the upper portion 113a of the back surface 113 of the seatback 110, in the upper surface 112 of the seatback 110, or in the curved portion 114 of the seatback 110; therefore, even when the transparent screen 20 is disposed at a position upward of the seatback 110 and vehicle rearward of the headrest 120, a video image can be projected onto the transparent screen 20 from the projector 30 disposed inside the seatback 110.

(J) In the projector 30, only the projection lens 31 can be visibly recognized from the vehicle cabin; therefore, the amount of exposure of the projector 30 from the seatback 110 can be reduced to zero or minimized, to thereby reduce a feeling of pressure felt by the occupant P2 in the rear seat 200, which is caused by the projector 30.

What is claimed is:

1. A vehicle display device, comprising:
   a transparent screen disposed in a vehicle cabin; and
   a projector that is disposed inside a seatback of a vehicle seat and projects a video image onto the transparent screen, wherein
   the projector has a projection lens exposed from an opening formed in the seatback into the vehicle cabin and projecting the video image onto the transparent screen,
   the seatback includes a back surface, an upper surface, and a curved portion connecting the back surface to the upper surface, and
   the opening of the seatback is formed in an upper portion of the back surface of the seatback, in the upper surface of the seatback, or in the curved portion of the seatback.

2. The vehicle display device according to claim 1, wherein the transparent screen is disposed upward of the seatback and vehicle rearward of a headrest of the vehicle seat.

* * * * *